United States Patent [19]

Gordon

[11] Patent Number: 4,987,820
[45] Date of Patent: Jan. 29, 1991

[54] ARMING UNIT

[75] Inventor: Francis R. Gordon, Berkshire, England

[73] Assignee: M. L. Aviation Company Ltd., Berkshire, England

[21] Appl. No.: 288,710

[22] Filed: Dec. 7, 1988

[30] Foreign Application Priority Data

Dec. 18, 1987 [GB] United Kingdom ............... 87-29593

[51] Int. Cl.$^5$ .............................................. B64D 1/04
[52] U.S. Cl. .................................... 89/1.55; 294/82.26
[58] Field of Search ....................... 89/1.55, 1.56, 1.1; 294/82.26

[56] References Cited

U.S. PATENT DOCUMENTS

| | | | |
|---|---|---|---|
| 3,285,132 | 11/1966 | McCurdy | 89/1.55 |
| 3,831,486 | 8/1974 | Yost | 89/1.55 |
| 4,520,711 | 6/1985 | Robinson | 89/1.55 |
| 4,682,530 | 7/1987 | Brown et al. | 89/1.55 |
| 4,754,686 | 7/1988 | Guitaut et al. | 89/1.55 |

Primary Examiner—David H. Brown
Attorney, Agent, or Firm—Nixon & Vanderhye

[57] ABSTRACT

An arming unit is used on an aircraft to control the arming of a store (20) containing explosive on its release from the aircraft so that the store is not armed until after its release and after it has travelled a predetermined distance away from the aircraft. Such an arming unit comprises a pivoted hook (12) for engaging and retaining the ring or loop (26) on the end of an arming wire attached to an arming pin on the store (20), the hook being biased into closed position, an inter-connection (16) between the hook (12) and a spring loaded plunger (4) having an extending portion constituting a sensor for engaging the upper surface of a store (20) to be released, the inter-connection (16) serving to open the hook (12) as a result of downward movement of the plunger (4) on release of the store (20), and a lock (22, 46) for holding the hook (12) in its closed position and thus preventing operation of the inter-connection (16). When a safe release is required, the lock (22, 46) is not operated and the interconnection (16) opens the hook to release the ring or loop (12) without restraint. On the other hand, if armed release is required, the lock (22, 46) is operated and prevents the inter-connection (16) from opening the hook (12) so that the ring or loop (26) is not released and the store (20) is armed by the arming wire after it has fallen a predetermined distance away from the aircraft.

7 Claims, 4 Drawing Sheets

ARMING UNIT

BACKGROUND TO THE INVENTION

This invention relates to the release from aircraft of stores containing explosives which are initiated by some means external to the aircraft, i.e. impact, barometric pressure and so forth. It is essential that such stores should be kept in a safe, unarmed state during their preliminary handling, carriage and ultimate release and ejection to a pre-set distance from the aircraft. For this purpose, each store must include an arming pin which, in one position ensures that the contents of the store are in a safe condition and in an alternative position "arms" the store and thus allows the contained explosive to be initiated. The requirement is, of course, that the pin should remain in the "safe" position until such time as the store has been released from the aircraft and has moved away from the aircraft by a pre-set distance; in some cases it may be required that the pin remains in the "safe" position throughout the subsequent fall of the store.

In operation, therefore, the pin is moved to the "armed" position so as to arm the store when it reaches the pre-set distance from the aircraft and mechanical methods for this purpose essentially involve connecting the arming pin on the store to an arming unit on the aircraft through an arming wire, lanyard, or shear wire of specified length and shear load. One end of the wire is securely attached to the arming pin in the store and the other end is attached to a ring which is inserted into the arming unit on the aircraft and retained during flight.

The arming wire includes a point of weakness, e.g. a shear pin or weak-link of which the shearing force is greater than the force necessary to set the arming pin on the store. Accordingly, when the store is to be released in the armed condition, the ring of the arming wire is retained by the arming unit on the aircraft and when, after release, the store reaches the full extent of the arming wire, the arming pin on the store is set by the tension in the wire, immediately after which the wire shears and the store falls away in the armed condition. The major part of the arming wire remains with the store and proof that arming was selected and functioned correctly on release is the retention in the arming unit of that part of the arming wire in-board of the point of weakness.

If the store is to be released in a safe or un-armed condition, the ring or loop at the end of the arming wire must be released before sufficient tension is developed in the arming wire to set the arming pin. The arming unit on the aircraft must therefore retain the loop or ring with a force which is appreciably less than that required to set the arming pin on the store, but sufficiently large to prevent the wire from being dislodged by in-flight aerodynamic forces or ground crew manual loading forces such as are encountered during routine maintenance. The "safe" setting loading is generally of the order of 16 lbs (7 kg), which is significantly less than the force required to arm the store. The arming unit on the aircraft therefore usually includes a spring retaining device which is overcome when the tension in the arming wire exceeds the value just referred to and a positive lock which retains the ring or loop to arm the store as described above.

The disadvantage of such an arrangement is that although the spring retention force on the ring or loop is designed to be significantly less than that required to arm the store, the dynamic conditions of arming wire release can result in very high shock loads in the arming wire which may be sufficient to arm the store when not intended. In other words, a store which is intended to be released in a safe condition is then inadvertently armed.

SUMMARY OF THE INVENTION

According to the present invention, an arming unit for use on an aircraft as described above comprises a pivoted hook for engaging and retaining the ring or loop on the end of an arming wire, the hook being biased into a closed position, an inter-connection between the hook and a spring loaded plunger having an extending portion constituting a sensor for engaging the upper surface of a store to be released, the inter-connection serving to open the hook as a result of downward movement of the plunger on release of the store and a lock for holding the hook in the closed position and thus preventing operation of the inter-connection. When a safe release is required, the lock is not operated and the inter-connection opens the hook to release the ring or loop without restraint. On the other hand, if armed release is required, the lock is operated and prevents the inter-connection from opening the hook so that the ring or loop is not released and the store is armed in the normal way.

In the normal operating position on the aircraft, both the axis of the plunger and the axis of the hook will be vertical and the hook preferably has a flat horizontal surface for engaging the ring or loop so that any tension on the latter will act through the pivot of the hook and thus not tend to open it. The hook conveniently bears against a surface of a casing for the plunger and has an inclined surface which, together with the surface of the casing defines a V-shaped space into which the ring of the arming wire can be pressed so as to produce a camming action which opens the hook against the effect of its spring bias and allows the ring to be inserted in position.

Most imply the lock for holding the hook in the closed position is constituted by the armature of a solenoid which, when the solenoid is operated, is caused to extend into a hole in the body of the hook and thus to lock it into position. The inter-connection between the hook and the plunger can then be constituted by a sliding pin which normally engages a small diameter portion of the plunger and, when the latter descends on release of a store, engages a larger diameter of the plunger which thus slides the pin to move the hook into the open position provided the lock has not been applied. If the lock has been applied, movement of the pin is prevented and descent of the plunger is blocked.

An alternative form of lock may be constituted by a second sliding pin which engages a portion of the hook extending on the opposite side of its pivot, thus preventing movement of the hook. Prior to release of the store, this second pin engages a large diameter portion of the plunger to hold the hook in the locked position. On descent of the plunger after release of a store and when safe release is required, the second pin moves into engagement with a smaller diameter portion of the plunger, thus allowing the pin to slide away from the hook and allowing the hook to open under the effect of the thrust from the first pin as already described. If armed release is required with this alternative form of construction, a solenoid is actuated to check the descent of the plunger before the second pin reaches the reduced diameter portion of the latter. The second pin therefore remains in engagement with the larger diameter of the plunger and thus continues to hold the hook in the locked position, thus retaining the ring and arming the store.

BRIEF DESCRIPTION OF THE DRAWINGS

Examples of the two alternative forms of construction in accordance with the invention will now be described with reference to the accompanying drawings, in which.

DESCRIPTION OF PREFERRED EXAMPLE

Figure 1:
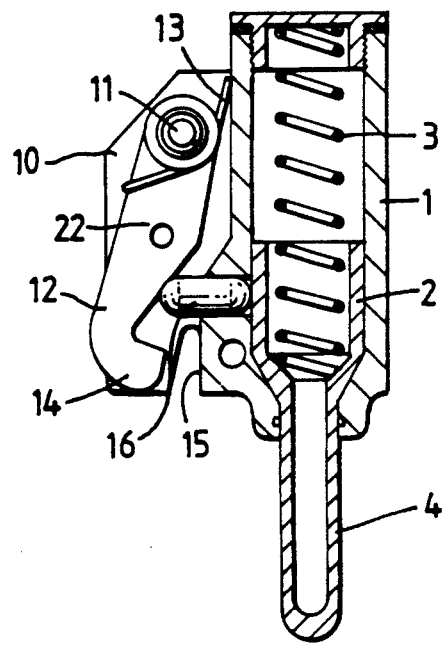
FIG. 1 is a longitudinal sectional view of a first form of construction with the parts in the position taken up before loading of a store.

Turning first to FIG. 1, an arming unit for use on an aircraft comprises a housing 1 for a plunger 2 which is loaded downwardly by a compression spring 3 into the position shown. The plunger 2 has a downward extension which comprises a sensor 4 which projects through an opening in the bottom of the housing 1 for engagement with a store to sense the presence of the latter when it is loaded in position. As shown in FIG. 1, no store is present and the plunger 2 and sensor 4 are in their lowest position.

The housing 1 has a projecting web 10 which carries a pivot 11 for a latching hook 12 which is biased in an anti-clockwise direction by a torsion spring 13 surrounding the pivot 11. The spring bias tends to move the operative part 14 of the hook against a surface 15 on the web 10, but in the position shown in FIG. 1, the hook is held away from this surface by a locking pin 16 which is free to slide in a passage in the housing 1.

Figure 2:
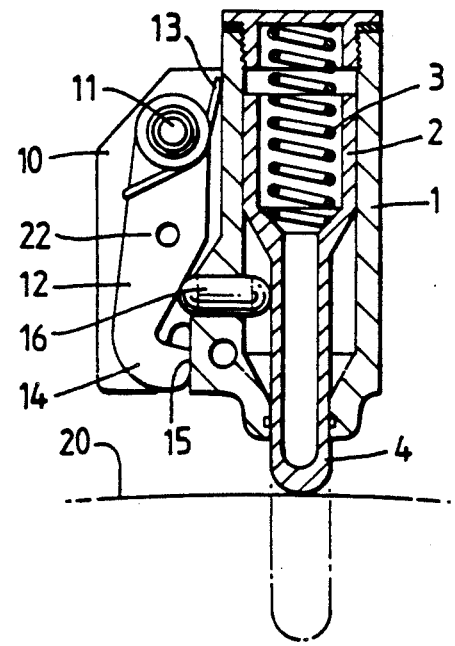
FIG. 2 is a similar view showing the position of the parts after loading of a store.

In the position shown in FIG. 1, the right hand end of the pin 16 is in engagement with the full diameter of the plunger 2 and its left hand end engages the hook 12 to hold it in the position shown. When a store is loaded in position, as shown in FIG. 2, the upper surface 20 of the store engages the sensor 4 and raises both the sensor 4 and the plunger 2, of which the sensor forms part, into the position shown in FIG. 2. The right hand end of the pin 16 thus comes into contact with a smaller diameter portion of the plunger 2, constituted by the sensor 4 and the pin is thus able to slide to the right as a result of pressure exerted by the hook 12 under the influence of the torsion spring 13. The operative portion 14 of the hook thus moves into contact with the surface 15 to define a V-shaped space for the introduction of the ring of the arming wire for the store. When the ring is pressed into this space, it has a camming action, turning the hook slightly in a clockwise direction against its bias until the ring is located in the space between the operative part of the hook and the locking pin 16.

The complete unit is mounted in the position shown with the plunger 2 vertical for engagement with the store as already described and the surface of the operative part 14 of the hook 12, which is engaged by the arming ring, is substantially horizontal so that any force exerted on the ring and transmitted to the hook acts through the pivot 11 and has no tendency to open the hook.

Figure 3:
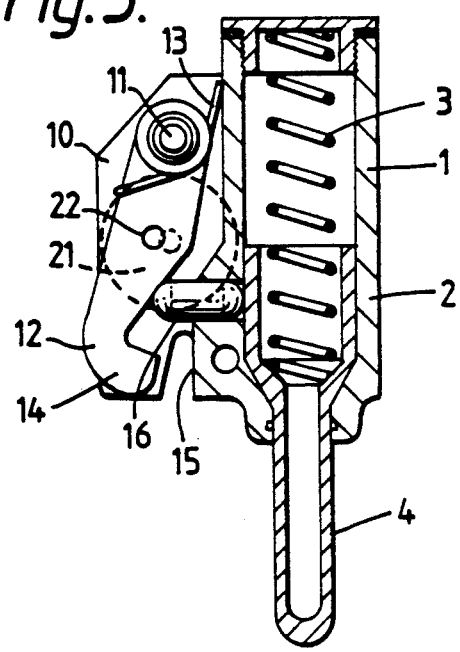
FIG. 3 is another similar view showing the position of the parts after the safe release of the store.

In addition to the locking pin 16, the hook 12 is also controlled by a solenoid lock which is situated behind the hook in the drawings The circular outline of the solenoid casing is seen in dotted lines at 21 in FIG. 3 and this has an armature which, when the solenoid is operated, projects into a locking opening 22 in the body of the hook 10. The solenoid is operated only when armed release is required and in the event of safe release as shown in FIG. 3, the release of the store allows the sensor 4 to extend into the position shown, thus bringing the full diameter of the plunger 2 into engagement with the right hand end of the pin 6, moving it to the left as shown and thus exerting a thrust on the hook 2 to move it to the open position as seen in FIG. 3. This releases the ring on the arming wire, allowing it to fall freely with the remainder of the wire and ensuring that the store cannot be armed.

Figure 4:
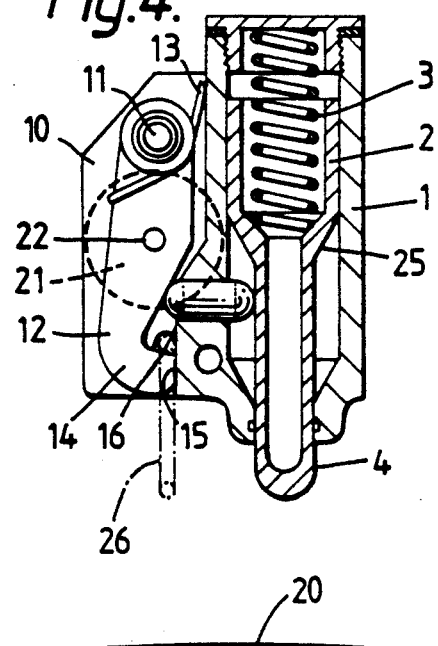
FIG. 4 is a further similar view of the position of the parts after the armed release of the store.
Figure 5:
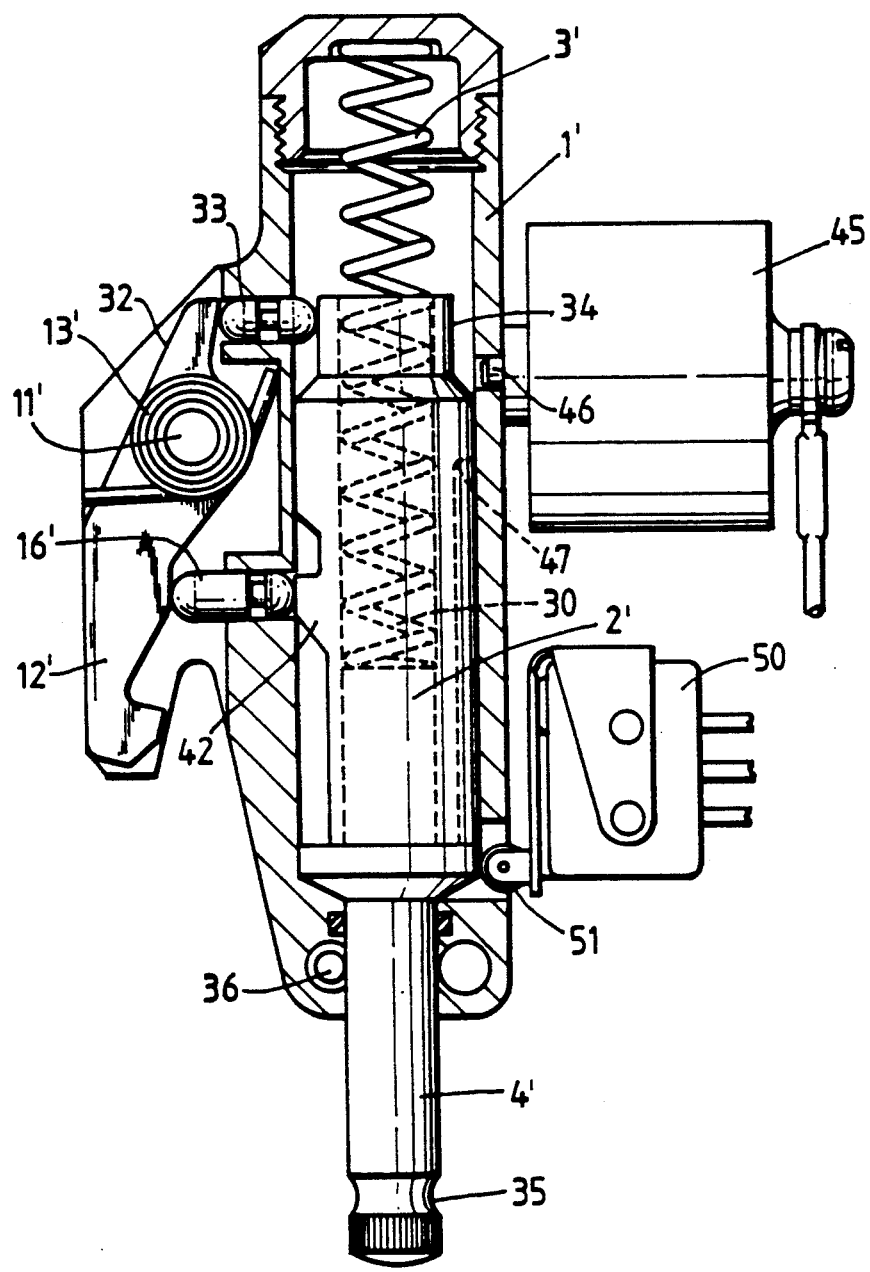
FIG. 5 is a view to an enlarged scale of an alternative form of construction with the parts in their positions after the safe release of a store.

When armed release is required, the locking solenoid is operated and its armature projects into the opening 22 in the hook 2, thus locking it in the closed position corresponding to FIG. 2. When the store is released, the sensor 4 and hence the plunger 2 starts to descend until an inclined surface 25 at the junction between the sensor 4 and the full diameter of the plunger 2 engages the pin 6. Owing to the fact that the hook 10 is locked, the pin 6 cannot move to the left and engagement with the surface 25 prevents further descent of the plunger 2. The hook 10 therefore remains in the closed position, the ring (shown in dotted lines as 26 in FIG. 4) remains in the hook and, as the store continues to fall, it is armed and the arming wire then shears in the usual way.

As a result of this construction, when safe release is required, the arming ring falls safely away without any restraint and there is no danger of the store being armed unintentionally. On the other hand, during routine maintenance and handling, when the hook 12 is merely biased into the closed position there is no danger of the ring being freed unintentionally since any force exerted on it has no opening effect on the hook, as already described.

An alternative construction performing essentially the same function is illustrated in FIGS. 5 to 9. In these Figures, parts corresponding to the same parts in FIGS. 1 to 4 are identified by the same reference numerals with a prime added.

Again there is a housing 1' enclosing a plunger 2' which is loaded by a spring 3'. In this construction, however, the store sensor 4' is slidable within the plunger 2' and is loaded by a separate spring 30. A hook 12' is pivoted at 11' and is controlled by a torsion spring 13'. The hook 12' is held in the open position against the effect of the spring bias by a pin 16' controlled by the plunger 2'. However, in this construction, the hook 12' has a portion 32 which extends on the opposite side of the pivot 11' and which is engaged by a second sliding pin 33 also controlled by the plunger 2'. In the position shown in FIG. 1, the hook 12' is locked in its outermost position by the pin 16 and the pin 33 engages a reduced diameter portion 34 of the plunger 2' so as to allow the portion 32 of the hook 12' to take up the position shown. This represents the static condition of the device.

Figure 6:
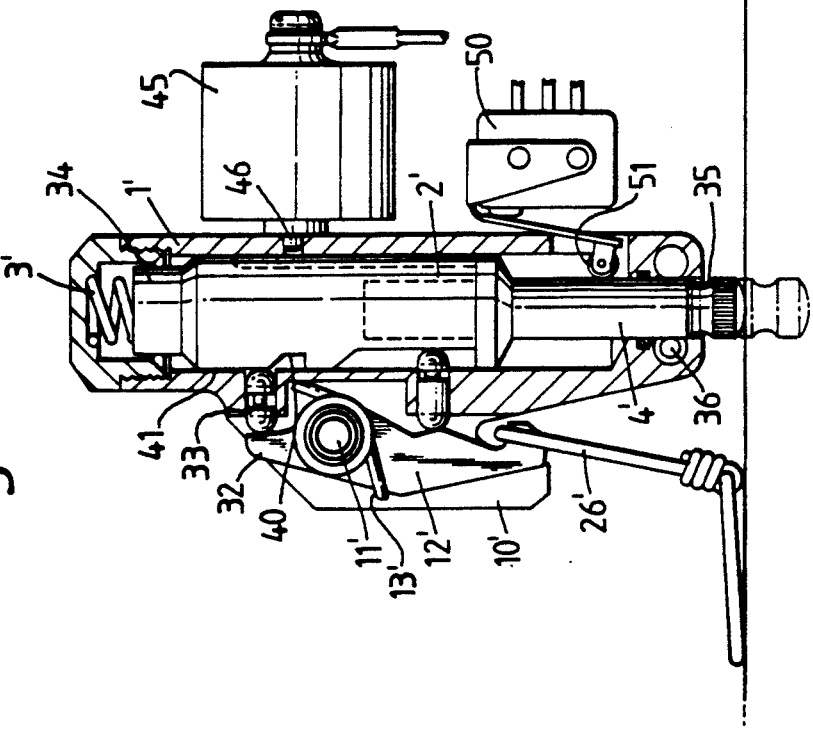
FIG. 6 is a view similar to FIG. 5 but to a reduced scale showing the parts in position prior to loading of a store.

The loading operation is illustrated in FIG. 6, from which it will be seen that the store sensor 4' is first raised until a depression 35 is engaged by an annular catch 36 which holds both the sensor 4' and the plunger 2' in this raised position. The store can now be fitted in position and the arming ring 26' engaged behind the hook 12' in the same manner as described with reference to FIGS. 1 to 4. The next stage is to depress the catch 36 which releases the sensor 4' and the plunger 2' until the former engages the upper surface of the store. The downward movement of the plunger 2' brings the pin 33 of which the right hand end was previously located in a recess 40 in the plunger 2' into engagement with a larger diameter portion 41 of the plunger 2' which forces the pin 33 to the left to engage the tail portion 32 of the hook 12' and thus to lock it in the closed position seen in FIG. 7 with the ring 26' firmly held. The mechanism is now set and ready for release.

Figure 8:
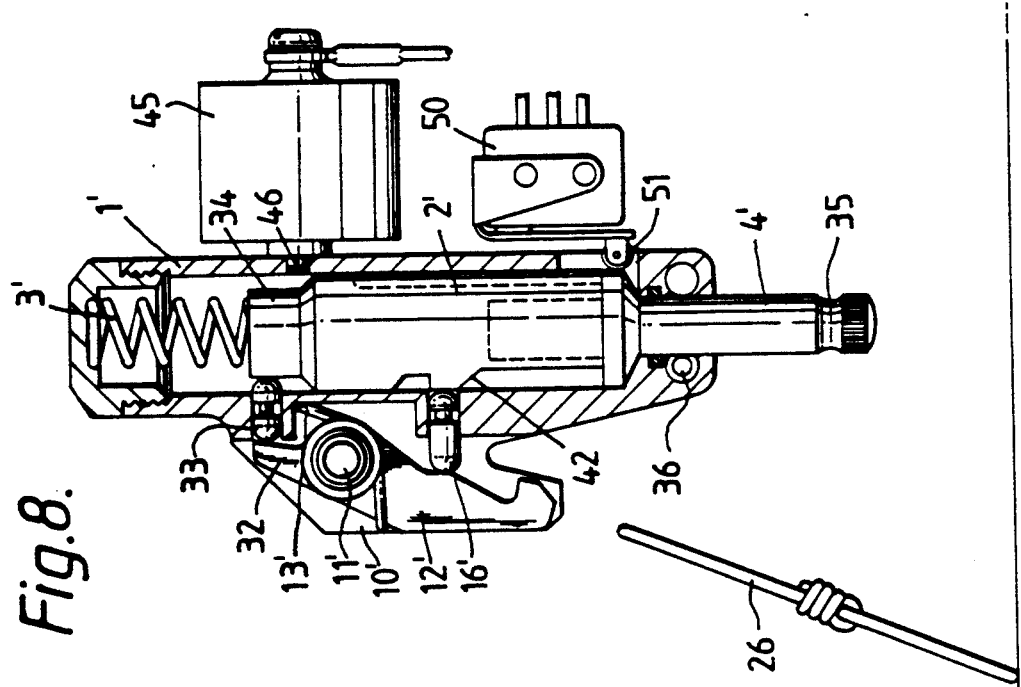
FIG. 8 is a further similar view showing the parts in position after a safe or un-armed release of the store.

The conditions for un-armed or safe release are illustrated in FIG. 8 and it will be seen that as soon as the store falls away, the sensor 4' and the plunger 2' descend to the position shown. The downward movement of the plunger 2' brings a projection 42 into engagement with the pin 16', moving this to the left and swinging the hook 12' to the open position to release the ring 26' which, as shown, falls away quite freely. At the same time the pin 33 engages the reduced diameter portion 34 of the plunger 2' to permit the movement of the hook.

Figure 9:
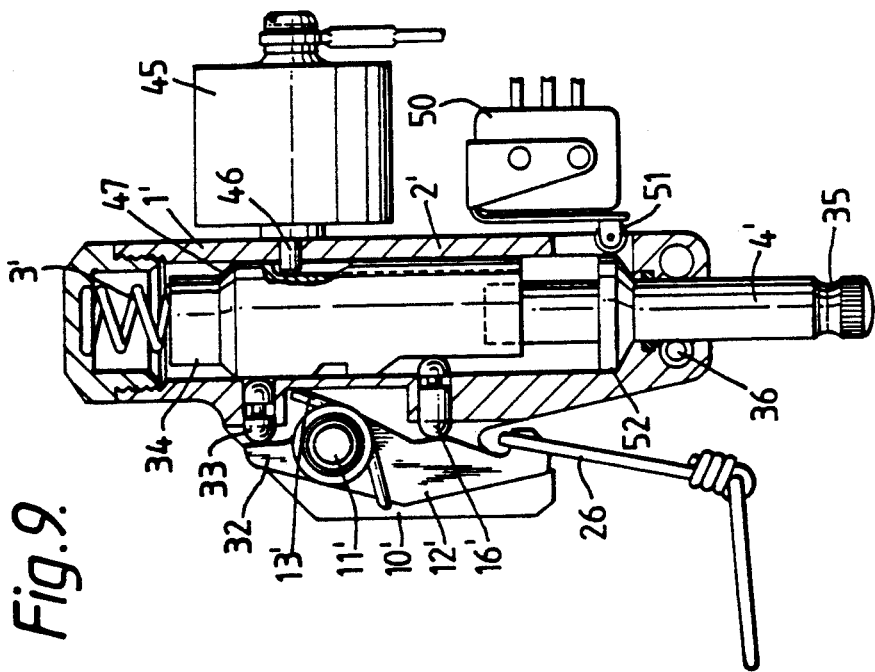
FIG. 9 is yet another view showing the parts in position after the armed release of a store.

If the store is to be armed, the hook 12' must be locked in the closed position as illustrated in FIG. 9. For this purpose, a solenoid 45 is energised which causes its armature 46 to project into contact with the surface of the plunger 2'. When the store is released, the plunger 2' descends as described with reference to FIG. 8, but before reaching the position of that Figure, its descent is checked by engagement of the armature 46 with a shoulder 47 on plunger 2', as illustrated in FIG. 9. This occurs before the pin 33 moves into engagement with the reduced diameter portion 34 of the plunger 2' and before the pin 16' is engaged by the projection 42. As a result, the hook 12' remains in the position shown in FIG. 7 since there is no thrust from the pin 16' to open it and, moreover, any movement is positively prevented by the action of the pin 33 bearing against the tail 32 of the hook. The hook therefore remains closed, the ring 26' is retained and, as previously described, the store is armed.

Figure 7:
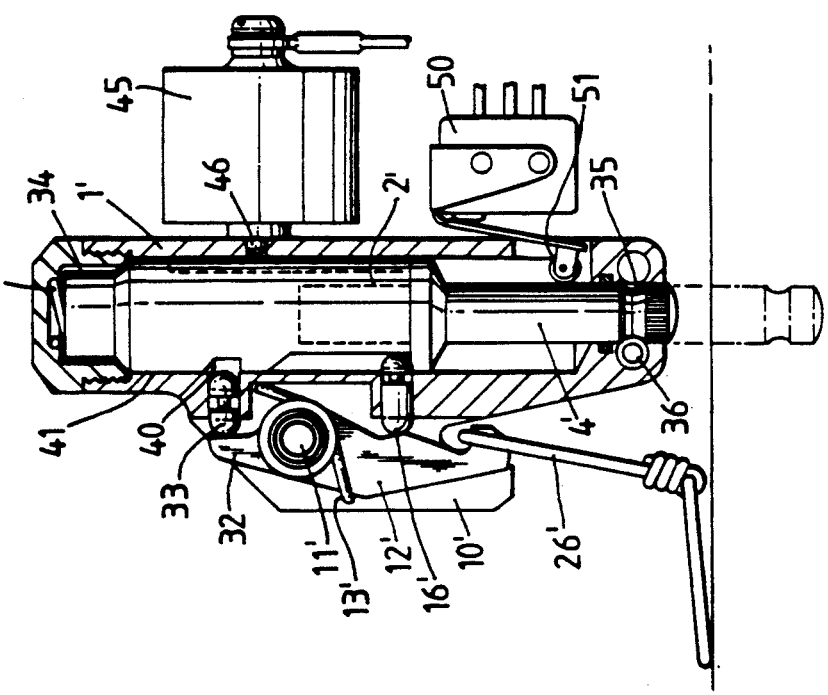
FIG. 7 is another similar view showing the parts in position after loading of the store.

A micro-switch 50 whose actuator 51 engages the sensor 4' provides an indication when the store is released. In the position of FIG. 7, the actuator is not depressed and there is an indication that the store is still engaged, but as the plunger 2' descends when the store is released, the actuator 51 is pressed to the right by a flange 52 on the sensor 4' and an indication is provided of "store gone". It will be seen from FIG. 9 that although the plunger 2 is checked in its descent, the sensor 4' moves downwardly in relation to the plunger under the influence of its spring 30, so that the flange 52 again actuates the micro-switch 50.

As with the first described construction, when a safe release is required, the ring 26' is released without any restraint at all, but prior to loading of the store, the hook 12' is biased into the closed position and any force exerted on the ring 26' has no opening effect on the hook.

The method of locking the hook 12' in the closed position during armed release, as just described, i.e. by causing the armature 46 of the solenoid 45 to project into contact with the surface of the plunger 2', may also be used with the construction of FIGS. 1 to 4 in place of that described and illustrated. In other words, the solenoid 21 of FIGS. 1 to 4, instead of being located behind the hook 12 is located in the position of the solenoid 45 of FIG. 5 so that its armature can engage a stepped groove in the plunger 2' and thus prevent the plunger moving to the position in which the hook 12' is opened.

I claim:

1. An arming unit for use on an aircraft to control the arming of a store containing explosive on its release from said aircraft, comprising:
   a hook for engaging and retaining a loop on an end of an arming wire attached to an arming pin on said store;
   a pivot pivotally mounting said hook;
   means biassing said hook into a closed position;
   a spring loaded plunger;
   an extended portion of said spring loaded plunger constituting a sensor for engaging an upper surface of said store to be released;
   an inter-connection means, located between said hook and said spring loaded plunger, for opening said hook as a result of downward movement of said plunger on release of said store; and,
   a lock, said lock comprising lock means for holding said hook in a closed position and thereby preventing operation of said inter-connection,
   whereby in use, when a safe, unarmed release is required, said lock is not operated and said inter-connection opens said hook to release said loop without restraint, but if armed release is required, said lock is operated and prevents said inter-connection from opening said hook so that the loop is not released and said store is armed by said arming wire as said store falls away from said aircraft.

2. The arming unit of claim 1, wherein in a normal operating position of said aircraft, both said plunger and said hook are vertical and said hook includes a flat horizontal surface for engaging said loop whereby tension on said surface acts through said pivot of said hook and thus does not tend to open it.

3. The arming unit of claim 1, wherein said arming unit includes a casing for said plunger and wherein said hook bears against said casing for said plunger, said hook includes an inclined surface which, together with said casing defines an inverted V-shaped space into which said loop of said arming wire can be pressed so producing a camming action which opens said hook against the effect of said biassing means and allows said loop to be inserted.

4. The arming unit of claim 1, wherein said inter-connection between said hook and said plunger includes a sliding pin located and acting between said hook and said plunger, and wherein said plunger includes a first small diameter portion and a large diameter portion, said pin normally engaging said first small diameter portion of said plunger, but when said plunger descends on release of said store said pin engages said large diameter portion of said plunger which thus slides said pin and moves said hook into said open position provided that said lock is not applied but, when said lock is applied, movement of said pin is prevented and descent of said plunger is blocked.

5. The arming unit of claim 4, which also includes a small sliding pin, said plunger including a second small diameter portion said second sliding pin being located and acting between said hook and said plunger, said second sliding pin engaging a portion of said hook extending on the opposite side of said pivot from that engaged by the first pin, said second sliding pin thus preventing movement of said hook prior to release of said store, said second pin engaging said large diameter portion of said plunger to hold said hook in said locked position, whereby in use, when safe release is required, on descent of said plunger upon release of said store said second pin moves into engagement with said second smaller diameter portion of said plunger, thus allowing said pin to slide and allowing said hook to open under the effect of the thrust from said first pin, but when armed release is required, said lock checks descent of said plunger before said second pin reaches said second small diameter portion of said plunger so that said second pin remains in engagement with said large diameter portion of said plunger and thus continues to hold said hook in said locked position, thus retaining said loop and arming said store.

6. The arming unit of claim 5, wherein said lock is constituted by a solenoid having an armature, when said lock is actuated, said armature is caused to engage said plunger and check its descent.

7. The arming unit of claim 4, wherein said lock for holding said hook in said closed position is constituted by a solenoid having an armature, and a hole in said hook, when said lock is operated, said armature is caused to extend into said hole in said hook and thus lock it into position.

* * * * *